June 12, 1923.
R. H. GRIFFITH
KEYED SHAFT COUPLING
Filed July 17, 1922
1,458,820
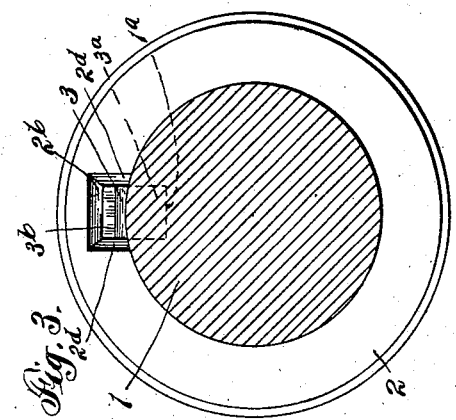
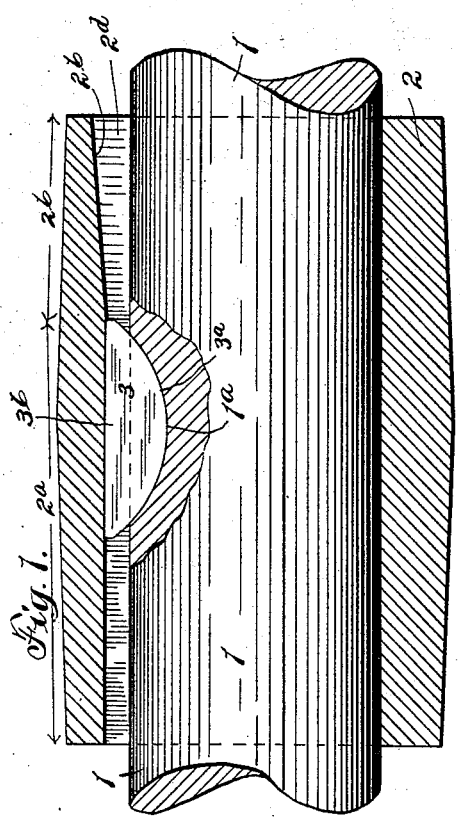
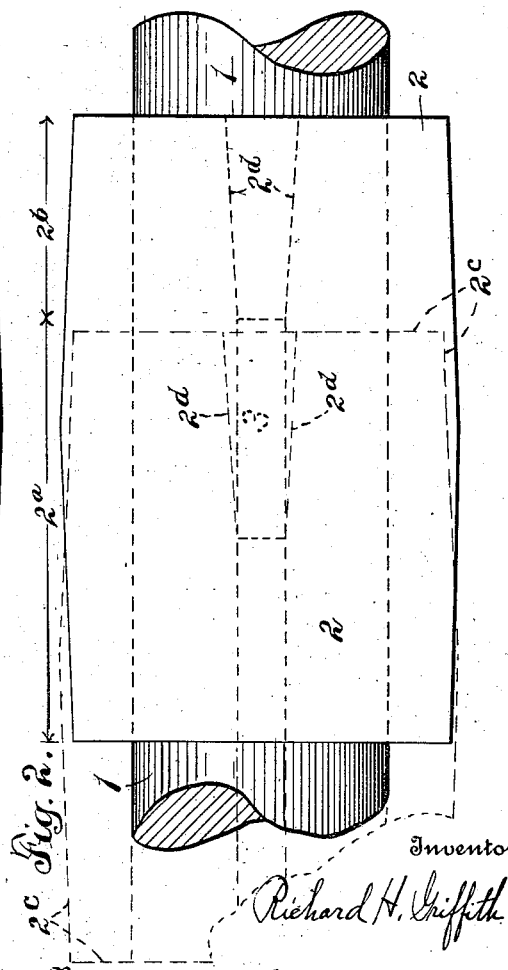
Inventor
Richard H. Griffith
By
Attorney Patented June 12, 1923.

1,458,820

UNITED STATES PATENT OFFICE.

RICHARD H. GRIFFITH, OF BELLEVUE, OHIO, ASSIGNOR TO THE OHIO CULTIVATOR COMPANY, OF BELLEVUE, OHIO, A CORPORATION OF OHIO.

KEYED-SHAFT COUPLING.

Application filed July 17, 1922. Serial No. 575,708.

*To all whom it may concern:*

Be it known that I, RICHARD H. GRIFFITH, a citizen of the United States, residing at Bellevue, in the county of Sandusky and State of Ohio, have invented certain new and useful Improvements in Keyed-Shaft Couplings, of which the following is a specification.

My invention relates to improvements in keyed shaft couplings and more particularly to that class or type in which keys are employed for holding or fastening members of varying specific forms to shafts. The present embodiment of the invention is particularly designed and adapted for use in connection with shafts provided with key seats and keys of the "Woodruff type," the invention relating particularly to the specific form of the key-way in the bearing or hub portion of the member to be keyed or secured upon the shaft.

The primary object of the invention is to provide a generally improved keyed shaft coupling or fastener of the class indicated which will be exceedingly simple in construction, cheap of manufacture, and efficient in use.

A further and very important object is to facilitate the mounting and demounting of the key-way member upon the key carrying shaft without injury to the sides of the key and key-way as now so frequently happens with the ordinary form of key-way used in connection with keys of the "Woodruff type."

A still further object is the provision of a keyed connection or coupling of the type mentioned which by protecting the sides of the key and key-way in the mounting and demounting operation will provide a more secure or stable seated connection between the parts when fully moved to their final seated or connected position.

There are other features of the invention residing in elemental combinations and particular construction of parts, all as will hereinafter more fully appear.

With the above mentioned and other ends in view, the invention consists in the novel construction, arrangement and combination of parts, hereinafter described, illustrated in one of its embodiments in the accompanying drawings, and particularly pointed out in the appended claims.

Referring to the drawings, forming a part of this specification, Figure 1 is a side elevation, and longitudinal section of a keyed shaft and key-way member, respectively, constructed and fastened in accordance with this invention.

Fig. 2, a top plan view of the same, the dotted lines illustrating the relative arrangement and cooperation of the parts and features of construction during the initial mounting or seating of the key-way member on the key carrying or shaft member.

Fig. 3, an end view of the same taken from the mouth or flaring key receiving end or section of the key-way.

Similar numerals of reference designate like parts throughout all the figures of the drawings.

The shaft 1, and member 2, to be secured thereon may be of any convenient form or type and forming no specific part of the present invention need not be described in detail. The member 2 provided with the improved key-way, hereinafter referred to, may take the specific form of a hub member as shown for the purpose of illustration in the drawings, or may take the form of a pulley, gear wheel, or the like.

The key-way member carrying portion of the shaft 1 has formed therein and longitudinally thereof a key seat $1^a$, which is concave throughout its length and deepest in the center thereof, as shown. Into this key seat the key 3, is inserted (this being in the present instance of the "Woodruff type"), the key member 3 having two opposite sides extending in parallel planes, its lower edge $3^a$, being of convex form to conform to the contour of the concavity $1^a$ of the key seat and having its upper edge $3^b$ projecting above the shaft 1 a proper distance to fit an ordinary key-way formed in a key-way carrying member 2, such as a hub, pulley, or gear wheel, as the occasion may demand. The formation of such keys and key seats being well known and extensively practiced the same need not be here described.

As usually formed the key-way portion of the member 2 corresponds in cross section throughout its entire length to the cross sectional dimensions or area of the upper projecting portion $3^b$, of the key 3, the result being that in the mounting and demounting of the key-way provided member 2 the sides of the key-way and key are frequently injured in the mounting and demounting of the member 2 as the key 3 slides in the key-way. Any injury of the sides of the parts mentioned frequently results in an imperfect connection of the parts when brought to their final mounted or seated positions.

As a means of overcoming the difficulty above mentioned I provide the shaft receiving portion of the member 2 with an improved key-way consisting of a main key-way section 2ª corresponding in cross section to the cross section dimensions of the projecting portion of the key 3 when the parts are finally seated as shown in Figs. 1 and 2 of the drawings, and an outwardly flaring or tapered key receiving key-way section 2ᵇ, the latter acting to initially receive and finally guide or direct the key 3 to the main or final key seating key-way section 2ª, as indicated by the dotted lines 2ᶜ, in Fig. 2 of the drawings, indicating the initial position and relation of the parts in the act of mounting the member 2 upon the shaft 1 and the key 3 seated therein.

It will be seen that the bottom and side walls 2ᵇ and 2ᵈ, of the initial key receiving key-way section 2ᵇ are gradually or gently flared outwardly toward the end or mouth of the section 2ᵇ so that the parts will readily take their seated positions as the member 2 is mounted upon or driven over and finally seated on the shaft 1 and key 3 carried thereby and it should be obvious that the danger of injury to the contacting sides or surfaces of the key and key-way are very much reduced over the old form of key-way of uniform cross sectional area throughout, as above described.

Having thus described one of the embodiments of my invention, without having attempted to set forth all the forms in which it may be made, or all the modes of its use, what I claim and desire to secure by Letters Patent, is—

1. A member provided with a key-way for Woodruff type keys having outwardly flaring bottom and side walls for receiving and guiding the key as said key-wayed member is passed over the keyed shaft.

2. In a key shaft coupling, a member provided with a key-way having flaring walls for initially receiving and guiding the key as said key-wayed member is moved over and finally seated on the keyed shaft.

3. In a key coupling of the Woodruff type, a shaft carrying a Woodruff key seat and key, and a member on said shaft provided with a registering key-way section of cross dimensions corresponding to the projecting portion of said key and having a key receiving end section including outwardly tapered side and base walls for receiving and guiding said key into said key seating section of said key-way as said member is driven over and finally seated on said shaft and key.

In testimony whereof I have affixed my signature.

RICHARD H. GRIFFITH.